US009619146B2

(12) United States Patent
Fujimori et al.

(10) Patent No.: US 9,619,146 B2
(45) Date of Patent: Apr. 11, 2017

(54) WORK MACHINE INCLUDING A CONTROLLER CONTROLLING OPERATION OF DIFFERENT COMPONENT OF WORK MACHINE

(71) Applicant: Komatsu Ltd., Tokyo (JP)

(72) Inventors: Toshiyuki Fujimori, Hiratsuka (JP); Shunsuke Sugimura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 417 days.

(21) Appl. No.: 14/233,235

(22) PCT Filed: Jul. 22, 2013

(86) PCT No.: PCT/JP2013/069831
§ 371 (c)(1),
(2) Date: Jan. 16, 2014

(87) PCT Pub. No.: WO2014/141496
PCT Pub. Date: Sep. 18, 2014

(65) Prior Publication Data
US 2015/0293702 A1 Oct. 15, 2015

(30) Foreign Application Priority Data
Mar. 14, 2013 (JP) ................................ 2013-052467

(51) Int. Cl.
*G07C 5/08* (2006.01)
*G06F 3/06* (2006.01)
*E02F 9/26* (2006.01)

(52) U.S. Cl.
CPC ............ *G06F 3/0604* (2013.01); *E02F 9/267* (2013.01); *G06F 3/0644* (2013.01);
(Continued)

(58) Field of Classification Search
None
See application file for complete search history.

(56) References Cited

U.S. PATENT DOCUMENTS 5,299,420 A * 4/1994 Devier ...................... E02F 9/22 137/596.16
8,532,865 B2 9/2013 Suzuki et al.
(Continued)

FOREIGN PATENT DOCUMENTS

CN 101675195 A 3/2010
CN 102216534 A 10/2011
(Continued)

OTHER PUBLICATIONS

International Search Report dated Aug. 13, 2013, issued for PCT/JP2013/069831.

*Primary Examiner* — Truc M Do
*Assistant Examiner* — Jess Whittington
(74) *Attorney, Agent, or Firm* — Locke Lord LLP

(57) ABSTRACT

A work machine includes a controller having a first storage unit that can store work machine information and rewrite the stored work machine information, and a processing unit that collects the work machine information, and stores at least one kind of the work machine information in the first storage unit when trigger information for causing the first storage unit to start storing the work machine information occurs. The controller can change from an outside at least one of the number of data prior to a trigger of the work machine information collected by the processing unit before the trigger information, the number of data subsequent to the trigger of the work machine information collected by the processing unit after the trigger information, and a time interval during which the work machine information is collected.

15 Claims, 11 Drawing Sheets

(52) U.S. Cl.
CPC ........... *G06F 3/0673* (2013.01); *G07C 5/085* (2013.01); *G07C 5/0808* (2013.01); *G07C 5/0841* (2013.01)

(56) References Cited

U.S. PATENT DOCUMENTS

| | | | | |
|---|---|---|---|---|
| 2003/0033062 | A1 | 2/2003 | Nishina | |
| 2003/0216889 | A1 | 11/2003 | Marko et al. | |
| 2005/0240372 | A1 | 10/2005 | Monk | |
| 2006/0230306 | A1* | 10/2006 | Richards ............... | G06F 11/076 714/6.32 |
| 2006/0247831 | A1* | 11/2006 | Shimokoshi ............ | F02D 41/22 701/31.4 |
| 2010/0070130 | A1 | 3/2010 | Suzuki et al. | |
| 2011/0213526 | A1* | 9/2011 | Giles ...................... | G07C 5/085 701/33.4 |
| 2011/0227744 | A1* | 9/2011 | Shibata .............. | G05B 23/0272 340/679 |
| 2011/0276842 | A1* | 11/2011 | Shibamori ......... | G05B 23/0264 714/49 |
| 2012/0317549 | A1* | 12/2012 | Cunningham ...... | G06F 11/3612 717/128 |

FOREIGN PATENT DOCUMENTS

| | | | |
|---|---|---|---|
| JP | 06-261408 | A | 9/1994 |
| JP | 2000-298748 | A | 10/2000 |
| JP | 2004-234437 | A | 8/2004 |
| JP | 2009-237798 | A | 10/2009 |
| JP | 2010-156152 | A | 7/2010 |
| JP | 2011-070397 | A | 4/2011 |

* cited by examiner

| A | B+C | D (ms) | L | |
|---|---|---|---|---|
| 40 | 120 | 50 | 6000 ms | 6 SECONDS |
| | | 200 | 24000 ms | 24 SECONDS |
| | | 5000 | 600000 ms | 10 MINUTES |
| 8 | 600 | 50 | 30000 ms | 30 SECONDS |
| | | 200 | 120000 ms | 2 MINUTES |
| | | 5000 | 300000 ms | 5 MINUTES |

FIG.7

CONF

| | ITEM | C1 | C2 | C3 |
|---|---|---|---|---|
| RC1 | AREA | 1, 2 | 3, 4, 5 | 1, 2, 8 |
| | TGM1 | NO | NO | SPECIFIED |
| | TGM2 | - | - | ERROR CODE |
| RC2 | MODE | OVERWRITE | OVERWRITE | PROTECTION |
| | A | 40 | 20 | 20 |
| | B | 100 | 220 | 120 |
| | C | 20 | 20 | 120 |
| | D | 50 ms | 50 ms | 200 ms |
| RC3 | MI1 | ENGINE SPEED | ← | ← |
| | MI2 | HYDRAULIC OIL PRESSURE | ← | VOLTAGE |
| | ⋮ | ⋮ | ⋮ | ⋮ |
| | MIk | - | - | VEHICLE SPEED |
| RC4 | MI1_AD | ○○×× | ××○○ | ×△○△ |
| | MI2_AD | ○○○× | △○○○ | ×○○○ |
| | ⋮ | ⋮ | ⋮ | ⋮ |
| | MIk_AD | - | - | ×××○ |

FIG.8

MID

| | | ITEM | C1 | C2 | C3 |
|---|---|---|---|---|---|
| HDR | HDR1 | ED_BT | | | |
| HDR | HDR1 | ED_AT | | | |
| HDR | HDR1 | ON_TIME | | | |
| HDR | HDR1 | B_SC | | | |
| HDR | HDR2 | HV1 | | | |
| HDR | HDR2 | HV2 | | | |
| HDR | HDR2 | ⋮ | | | |
| HDR | HDR2 | HVn | | | |
| HDR | HDR3 | HVT1 | | | |
| HDR | HDR3 | HVT2 | | | |
| HDR | HDR3 | ⋮ | | | |
| HDR | HDR3 | HVTn | | | |
| | TSR | MI1 | | | |
| | TSR | MI2 | | | |
| | TSR | ⋮ | | | |
| | TSR | MIk | | | |

WORK MACHINE INCLUDING A CONTROLLER CONTROLLING OPERATION OF DIFFERENT COMPONENT OF WORK MACHINE

FIELD

The present invention relates to a work machine.

BACKGROUND

Work machines, for example, transport machines such as forklift trucks, and construction machines or mining machines such as excavators and dump trucks, are used in various working sites. Such work machines include those that detect the occurrence of an abnormality based on operation information of the work machine input from various sensors to monitor the abnormality of the work machine. For example, Patent Literature 1 describes a technology for storing snapshot data on an abnormality that occurred in a snapshot data storage unit based on priority determined in accordance with the level of emergency response to the abnormality that occurred.

CITATION LIST

Patent Literature

Patent Literature 1: Japanese Laid-open Patent Publication No. 2011-70397

SUMMARY

Technical Problem

A storage unit that stores information on a work machine, including the operation information of the work machine, is limited in storage capacity. Therefore, a device that collects the information on the work machine and retrieves the collected information to the outside seeks means for effectively using the limited capacity of the storage unit.

An object of the present invention is to effectively use hardware resources on the work machine side, especially the storage unit, when collecting the information on the work machine from the work machine.

Solution to Problem

According to the present invention, a work machine comprises a controller including: a storage unit capable of storing work machine information as information on the work machine; and a processing unit configured to collect the work machine information and to cause at least one kind of the work machine information to be stored in the storage unit when trigger information for causing the storage unit to start storing the work machine information occurs, wherein at least one of the number of data prior to a trigger of the work machine information collected by the processing unit before the trigger information, the number of data subsequent to the trigger of the work machine information collected by the processing unit after the trigger information, and a time interval during which the work machine information is collected is changeable from an outside of the controller.

In the present invention, it is preferable that the kind of the work machine information is changeable.

In the present invention, it is preferable that the storage unit stores definition information where the number of data prior to the trigger, the number of data subsequent to the trigger, and the time interval, which are to be stored, are described, and the processing unit is configured to collect the work machine information in accordance with the number of data prior to the trigger, the number of data subsequent to the trigger, and the time interval, which are described in the definition information.

In the present invention, it is preferable that the storage unit stores definition information where the number of data prior to the trigger, the number of data subsequent to the trigger, the time interval, and the kind of the work machine information, which are to be stored, are described, and the processing unit saves the collected work machine information in the storage unit in accordance with the number of data prior to the trigger, the number of data subsequent to the trigger, the time interval, and the kind of the work machine information, which are described in the definition information.

In the present invention, it is preferable that the definition information is rewritten from the outside of the controller to change at least one of the number of data prior to the trigger, the number of data subsequent to the trigger, and the time interval.

In the present invention, it is preferable that the definition information is rewritten from the outside of the controller to change at least one of the number of data prior to the trigger, the number of data subsequent to the trigger, the time interval, and the kind of the work machine information.

In the present invention, it is preferable that the work machine, further comprises a plurality of the controllers each being able to change the number of data prior to the trigger, the number of data subsequent to the trigger, and the time interval individually.

In the present invention, it is preferable that the work machine, further comprises a plurality of the controllers each being able to change the number of data prior to the trigger, the number of data subsequent to the trigger, the time interval, and the kind of the work machine information individually.

In the present invention, it is preferable that the work machine, further comprises a communication unit configured to communicate with the outside of the controller, wherein the definition information is rewritable by wireless communication via the communication unit from the outside of the controller.

According to the present invention, a work machine comprises a controller including: a storage unit capable of storing work machine information as information on the work machine; and a processing unit configured to collect the work machine information, and causing at least one kind of the work machine information to be stored in the storage unit based on trigger information for causing the storage unit to start saving the work machine information, wherein the processing unit is configured to cause the work machine information collected in accordance with definition information where at least one of the number of data prior to a trigger of the work machine information collected by the processing unit before the trigger information, the number of data subsequent to the trigger of the work machine information collected by the processing unit after the trigger information, and a time interval during which the work machine information is collected is described and stored in the storage unit, and is changeable from an outside of the controller, to be stored in the storage unit, and the storage unit is different from a storage unit where an instruction to cause the processing unit to execute an operation to save the work machine information in the storage unit is saved.

In the present invention, it is preferable that the kind of the work machine is changeable.

In the present invention, it is preferable that a plurality of kinds of the definition information is stored in the storage unit.

In the present invention, it is preferable that the plurality of kinds of the definition information is individually changeable from the outside of the controller.

In the present invention, it is preferable that after the definition information stored in the storage unit is rewritten, when a key switch of the work machine is turned on, the rewritten definition information becomes effective.

The present invention can effectively use the hardware resources on the work machine side, especially the storage unit, when collecting the information on the work machine from the work machine.

BRIEF DESCRIPTION OF DRAWINGS

FIG. 7 is a diagram illustrating an example of a definition file.

FIG. 8 is a diagram illustrating an example of the work machine data.

DESCRIPTION OF EMBODIMENTS

A mode for carrying out the present invention (embodiment) will be described in detail with reference to the drawings. The present invention is not limited by the contents described below in the embodiment. Moreover, a description will be given of the following embodiment taking an excavator as an example of a work machine.

However, a work machine targeted in the following embodiment is not limited to the excavator. The work machine may be, for example, a forklift truck, a wheel loader, or a dump truck.

<Entire Configuration of Work Machine>

Figure 1:
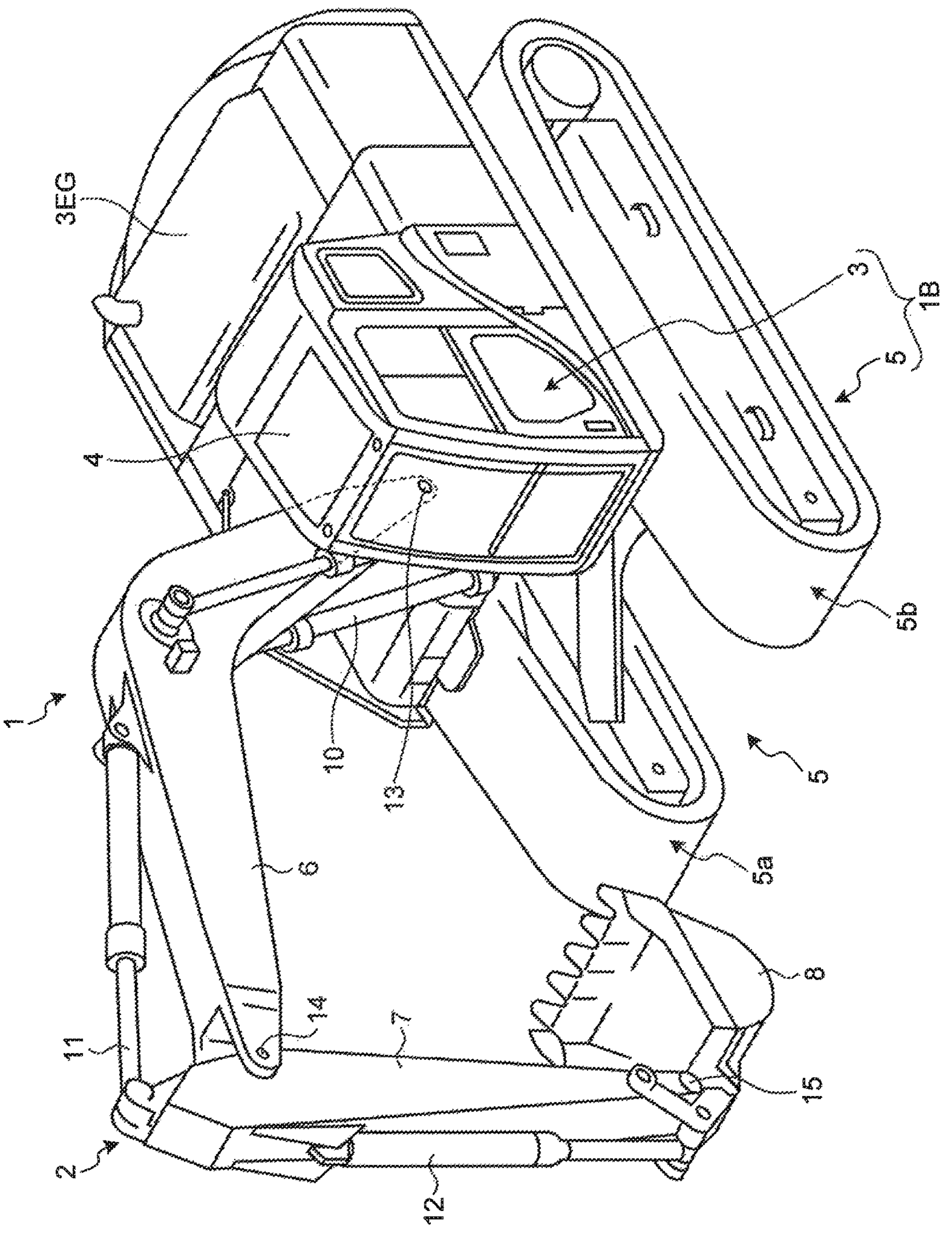
FIG. 1 is a perspective view of a work machine according to the embodiment.

FIG. 1 is a perspective view of a work machine 1 according to the embodiment. In the embodiment, the work machine 1 is an excavator. The work machine 1 includes a vehicle base machine 1B and work equipment 2 as a base machine unit. The vehicle base machine 1B includes an upper structure 3 and a travel device 5. The upper structure 3 contains unillustrated power generation device and devices such as a hydraulic pump in an engine compartment 3EG. The engine compartment 3EG is arranged on one end side of the upper structure 3.

In the embodiment, the work machine 1 has an internal combustion engine such as a diesel engine as the power generation device. However, the work machine 1 is not limited to such a thing. The work machine 1 may be, for example, one including what is called a hybrid power generation device where an internal combustion engine, a generator motor, and a storage battery are combined.

The upper structure 3 includes a cab 4. The cab 4 is mounted on the other end side of the upper structure 3. In other words, the cab 4 is arranged opposite to the side where the engine compartment 3EG is arranged. An unillustrated display input device and operation device are arranged in the cab 4. The travel device 5 includes crawlers 5*a* and 5*b*. Unillustrated hydraulic motors are driven to rotate the crawlers 5*a* and 5*b* and accordingly the travel device 5 travels to cause the work machine 1 to travel. The work equipment 2 is attached to a side of the cab 4 of the upper structure 3.

The work machine 1 may be one including a travel device that includes tires instead of the crawlers 5*a* and 5*b* and that can travel by transmitting a driving force of an unillustrated diesel engine to the tires via a transmission. For example, the work machine 1 in such a form may be a wheel excavator. Moreover, the work machine 1 may be, for example, a backhoe loader having a structure that includes such a travel device with tires, and work equipment further attached to a vehicle base machine (base machine unit), the structure excluding an upper structure and its swing mechanism as in FIG. 1. In other words, the backhoe loader is one including work equipment attached to a vehicle base machine, and a travel device constructing a part of the vehicle base machine.

In terms of the upper structure 3, the side where the work equipment 2 and the cab 4 are arranged is defined as front, and the side where the engine compartment 3EG is arranged is defined as rear. The left side when facing the front is defined as the left of the upper structure 3, and the right side when facing the front is defined as the right of the upper structure 3. Moreover, in terms of the work machine 1 or the vehicle base machine 1B, the travel device 5 side with respect to the upper structure 3 is defined as down and the upper structure 3 side with respect to the travel device 5 is defined as up. If the work machine 1 is placed on a horizontal plane, down is a vertical direction, in other words, the gravity working direction side, and up is opposite to the vertical direction.

The work equipment 2 includes a boom 6, an arm 7, a bucket 8, a boom cylinder 10, an arm cylinder 11, and a bucket cylinder 12. A base portion of the boom 6 is swingably attached to the front of the vehicle base machine 1B via a boom pin 13. A base portion of the arm 7 is swingably attached to a tip portion of the boom 6 via an arm pin 14. The bucket 8 is swingably attached to a tip portion of the arm 7 via a bucket pin 15.

The boom cylinder 10, the arm cylinder 11, and the bucket cylinder 12, which are illustrated in FIG. 1, are respectively hydraulic cylinders driven by the pressure of hydraulic oil (hereinafter appropriately referred to as the hydraulic pressure). The boom cylinder 10 drives the boom 6 to lift the boom 6 up and down. The arm cylinder 11 drives the arm 7 to rotate about the arm pin 14. The bucket cylinder 12 drives the bucket 8 to rotate about the bucket pin 15. Unillustrated proportional control valves are respectively arranged between the hydraulic cylinders such as the boom cylinder 10, the arm cylinder 11, and the bucket cylinder 12 and the unillustrated hydraulic pumps. The proportional control valves are controlled to control the flow rate of the hydraulic oil supplied to the boom cylinder 10, the arm cylinder 11, and the bucket cylinder 12. As a consequence, the operations of the boom cylinder 10, the arm cylinder 11, and the bucket cylinder 12 are controlled.

<Information-on-the-work-machine Collection System>

Figure 2:
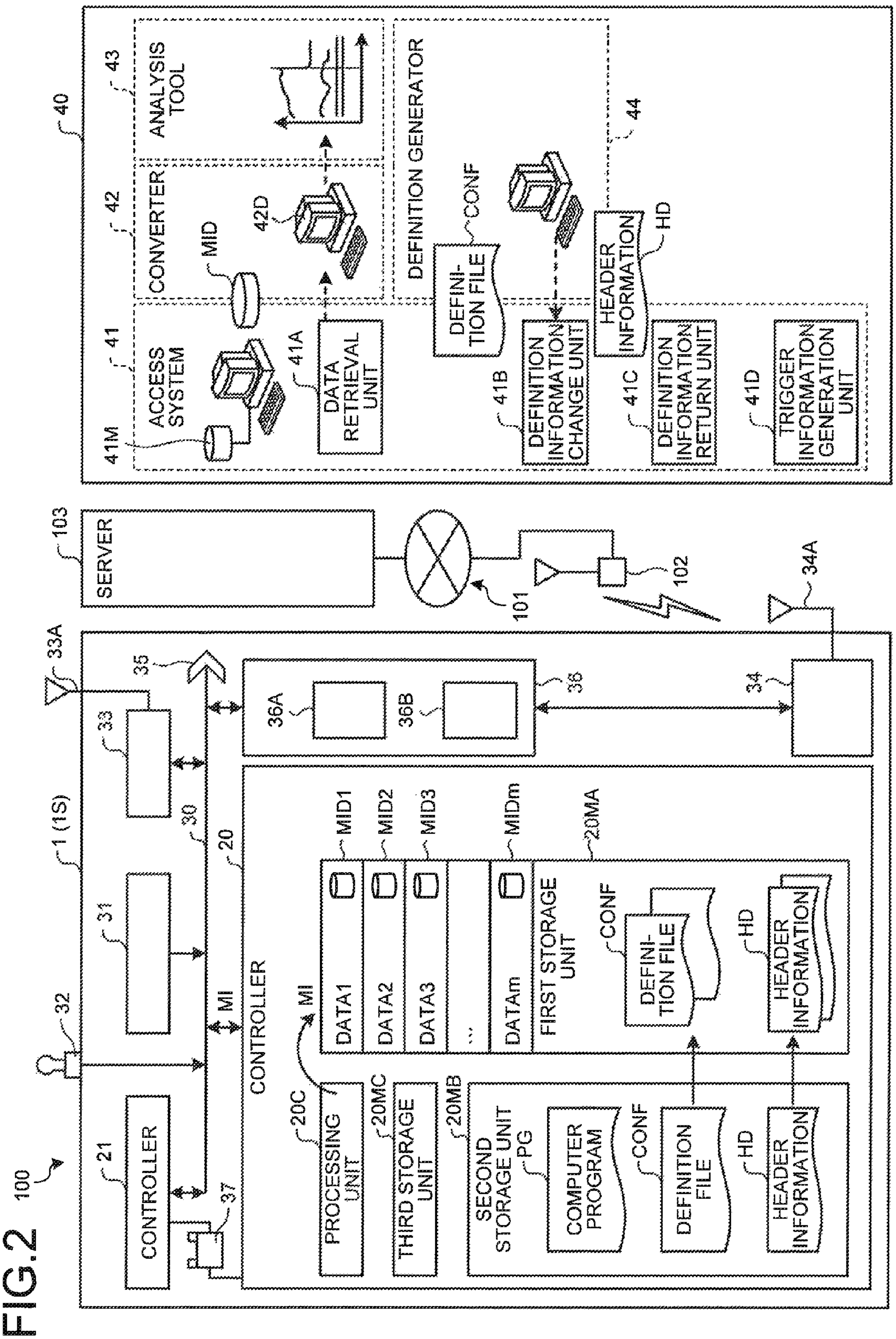
FIG. 2 is a diagram illustrating a work machine's information collection system.

FIG. 2 is a diagram illustrating an information-on-the-work-machine collection system 100. The information-on-the-work-machine collection system (hereinafter appropriately referred to as the information collection system) 100 includes a vehicle-mounted system 1S included in the work machine 1, and a system for the management of the work machine (hereinafter appropriately referred to as the management system) 40 included in a management facility. The information collection system 100 exchanges information between the vehicle-mounted system 1S and the management system 40 via a communication line 101 and a server 103. In the information collection system 100, the management system 40 acquires work machine data MID from the vehicle-mounted system 1S via the communication line 101. Moreover, the information collection system 100 uses the management system 40 to rewrite at least one of the contents of a definition file CONF and header information HD, which are stored in a first storage unit 20MA of a controller 20 of the vehicle-mounted system LS, from the outside of the controller 20. In the embodiment, for convenience of description, one work machine 1 and vehicle-mounted system 1S, and one management system 40 are respectively connected to the information collection system 100 via the communication line 101 and the server 103. However, the numbers of the work machines 1 and the management systems 40 are not limited. The information collection system 100 may not include the server 103. In this case, the vehicle-mounted system 1S and the management system 40 exchange information with each other via the communication line 101.

(Vehicle-Mounted System 1S Included in Work Machine 1)

In the vehicle-mounted system 1S included in the work machine 1, the controller 20 and a controller 21, a various sensors group 31, a key switch 32, a location detection device 33, and an input/output device 36 are connected by an in-vehicle communication line 30 to communicate with each other. The key switch 32 is provided in the vicinity of an operator's seat in the cab 4. An operator of the work machine 1 operates the key switch 32 to enable the start or stop of an engine of the work machine 1. For example, a switch of an ignition key can be used for the key switch 32. The controllers 20 and 21 control different functions of the work machine 1, respectively. The controller 20 is, for example, a controller that controls the engine of the work machine 1. The controller 21 is, for example, a controller that controls the operation of the unillustrated hydraulic pump of the work machine 1. In terms of the vehicle-mounted system 1S, the number of controllers connected to the in-vehicle communication line 30 is not limited to two, but a controller other than the controllers 20 and 21 may be connected to the in-vehicle communication line 30.

The controller 20 includes a processing unit 20C, and the first storage unit 20MA, a second storage unit 20 MB, and a third storage unit 20MC as storage units. The processing unit 20C is, for example, a CPU (Central Processing Unit). For example, a DRAM (Dynamic Random Access Memory) or an SRAM (Static Random Access Memory) is used for the third storage unit 20MC. The third storage unit 20MC stores, for example, a computer program where an instruction to control the work machine 1 is described.

The processing unit 20C collects work machine information MI as information on the work machine 1. In this case, the processing unit 20C collects the work machine information MI via the in-vehicle communication line 30. The processing unit 20C stores the collected work machine information MI in the first storage unit 20MA or the third storage unit 20MC. When trigger information for starting the storage of the work machine information MI in the first storage unit 20MA occurs, the processing unit 20C stores the collected work machine information MI in the first storage unit 20MA. In this case, the processing unit 20C stores at least one kind of or at least part of the collected work machine information MI in the first storage unit 20MA. It is sufficient if the work machine information MI is information having some relationship with the work machine 1. The work machine information MI is, for example, information on the status of the work machine 1 detected by the various sensors group 31, information on the status of the vehicle-mounted system 1S of the work machine 1, information on a work environment of the work machine 1, such as an outside air temperature or atmospheric pressure, and ID information for identifying the work machine 1.

The first storage unit 20MA can both store information and rewrite the stored information. The first storage unit 20MA can hold the stored information with electricity supplied from a power supply (a secondary battery such as a lead storage battery or nickel-hydrogen storage battery) 37 mounted on the work machine 1. For example, an SRAM (Static Random Access Memory) is used for the first storage unit 20MA. The first storage unit 20MA stores a plurality of work machine data MID1, MID2, . . . MIDm, and the definition file CONF and the header information HD as definition information. If the work machine data MID1, MID2, . . . MIDm are not distinguished, they are referred to as the work machine data MID. In the embodiment, the first storage unit 20MA is configured to be capable of storing m (m is an integer) sets of the work machine data MID. The number of the work machine data MID that can be stored in the first storage unit 20MA is not limited. The numbers of the definition files CONF and pieces of the header information HD that are stored in the first storage unit 20MA are not limited, either, and may be single or multiple. The work machine data MID is that the work machine information MI prior to and subsequent to the above-mentioned trigger information is chronologically stored. The definition file CONF is described in detail below, but the settings of the definition file CONF and the header information also enable the work machine data MID to store only information prior to the trigger information or only information subsequent to the trigger information.

The second storage unit 20 MB can hold the stored information. The second storage unit 20 MB is, for example, a ROM (Read Only Memory). The processing unit 20C can read or store information or rewrite the stored information at any time from or in the first storage unit 20MA, but can read information at any time from the second storage unit 20MB but cannot store information or rewrite the stored information in the second storage unit 20 MB. The second storage unit 20 MB needs a special process to rewrite the stored information. The second storage unit 20 MB stores a computer program PG, the definition file CONF, and the header information HD. The definition file CONF and the header information HD that are stored in the second storage unit 20 MB are prestored information, and indicate default contents. The computer program PG describes an instruction to cause the processing unit 20C to interpret information described in the definition file CONF, generate the work machine data MID based on the result, and store the work machine data MID in a predetermined area of the first storage unit 20MA. The computer program PG may be stored in the third storage unit 20MC.

If the operator operates the key switch 32 to start the engine of the work machine 1, electricity is sent from the power supply 37 to the controller 20, and the processing unit 20C checks whether or not the information of the definition file CONF and the header information HD that are stored in the first storage unit 20MA are damaged. The following contents are executed in the check. A predetermined check value is preset for the definition file CONF and the header information HD that are stored in the first storage unit 20MA. In other words, when a new definition file and header information HD are stored in the first storage unit 20MA, a check value unique to the definition file and header information HD is also stored in the first storage unit 20MA. The check value is, for example, the number of kinds of information contained in the definition file CONF and the header information HD. The check values vary depending on the definition file and the header information HD. Hence, the check value does not necessarily agree with the check value of the definition file CONF and the header information HD that are stored in the second storage unit 20 MB. Whenever the key switch 32 is operated and the work machine 1 starts up, the check value of the definition file CONF and the header information HD that are stored in the first storage unit 20MA is calculated and the obtained check value is checked whether or not to agree with the prestored check value. If they do not agree, it indicates that the definition file CONF or the header information HD that is stored in the first storage unit 20MA is damaged. If the damage is detected, the processing unit 20C copies into the first storage unit 20MA the definition file CONF and the header information HD that stored in the second storage unit 20 MB. If generating the work machine data MID, then the processing unit 20C reads and uses the definition file CONF and the header information HD that have been copied into the first storage unit 20MA. The check that uses a check value in this manner is called a cyclic redundancy check, and is made by a method referred to as CRC (Cyclic Redundancy Check).

The controller 21 has a similar structure to the controller 20, but its control target is different from that of the controller 20. The controller 21 also includes the processing unit 20C, and the first storage unit 20MA, the second storage unit 20 MB, and the third storage unit 20MC as storage units, similarly to the controller 20. One of the controllers 20 and 21 transmits an instruction, information, or the like to the other through the in-vehicle communication line 30 and the other transmits an instruction, information, or the like to the one of them.

The in-vehicle communication line 30 is connected to the various sensors group 31, the key switch 32, the location detection device 33, the input/output device 36, and a service connector 35, in addition to the controllers 20 and 21. The various sensors group 31 is a group of sensors for detecting the status of the work machine 1. The various sensors group 31 is, for example, engine speed (engine speed per unit time), the temperature of the coolant of the engine (engine coolant temperature), voltage across the power supply 37, the pressure of the hydraulic oil (hydraulic oil pressure), the temperature of the hydraulic oil (hydraulic oil temperature), the outside air temperature of the work machine 1, the pressure of the outside air of the work machine 1, the speed of the work machine 1 (vehicle speed), and the like.

If the work machine 1 is a wheel loader, the temperature of the hydraulic oil of a torque converter, the temperature of the brake oil, and the like are also detected. In other words, the sensors group 31 is different depending on the vehicle size class or kind of the work machine 1. The key switch 32 is the switch of the ignition key. The location detection device 33 is, for example, a device for realizing RTK-GNSS (Real Time Kinematic-Global Navigation Satellite Systems, GNSS indicates a global navigation satellite system). The location detection device 33 includes an RTK-GNSS antenna 33A. The location detection device 33 detects the current location of the work machine 1. The location detection device 33 is also a kind of the sensors group for detecting the status of the work machine 1. For example, a GPS (Global Positioning System) sensor can be used as the location detection device 33, and the location detection device 33 can use a GPS antenna 33A.

The input/output device 36 is a control device that inputs and outputs information between the vehicle-mounted system 1S and the outside of the vehicle-mounted system 1S. In the embodiment, the input/output device 36 includes a gateway 36A and a start-up control unit 36B. The gateway 36A is a connection device for connecting the in-vehicle communication line 30 to the communication line 101 outside the work machine 1. The start-up control unit 36B can turn on the power to and start the vehicle-mounted system 1S at the instruction of the management system 40. The operation of the key switch 32 also enables the turning-on of the power to the vehicle-mounted system 1S.

The input/output device 36 is connected to a communication unit 34 included in the vehicle-mounted system 1S included in the work machine 1. The communication unit 34 includes a communication antenna 34A and can realize wireless communication with a base station 102. The wireless communication can use terrestrial communication, satellite communication, or the like. The base station 102 is connected to the communication line 101. The server 103 is connected to the communication line 101. The communication unit 34 can exchange information with the management system 40 via the base station 102, the communication line 101, and the server 103. The service connector 35 is connected to the in-vehicle communication line 30. For example, a check device is connected to the service connector 35 to enable the diagnosis of the statuses of the controllers 20 and 21 or the various sensors group 31, and the rewriting and reading of information stored in the first storage unit 20MA, the second storage unit 20 MB, or the like of the controller 20 or the like.

(Management System 40)

The management system 40 is connected to the communication line 101 via the server 103. The management system 40 includes an access system 41, a converter 42, an analysis tool 43, and a definition generator 44. They are computers. The access system 41 includes a data retrieval unit 41A, a definition information change unit 41B, a definition information return unit 41C, and a trigger information generation unit 41D.

In the embodiment, the access system 41, the converter 42, the analysis tool 43, and the definition generator 44 are configured to be capable of data communication with one another as individual computers as illustrated in FIG. 2. However, the management system 40 may be configured such that one computer has the functions of the access system 41, the converter 42, the analysis tool 43, and the definition generator 44. The management system 40 may be configured by including the server 103 in the management system 40.

The data retrieval unit 41A retrieves the work machine data MID from the controllers 20 and 21 of the work machine 1 to save the work machine data MID in a storage device 41M included in the access system 41. The definition information change unit 41B rewrites the definition file CONF or the header information HD as the definition information stored in the first storage unit 20MA of the controller 20 or the like to the content of new definition information generated by the definition generator 44. The rewrite process of the definition information change unit 41B makes the content of the definition file CONF or the header information HD stored in the first storage unit 20MA to be rewritten. In this manner, the definition file CONF and the header information HD can be individually changed from the outside of the controller 20 or 21. The same shall apply to a case where a plurality of the definition files CONF or pieces of the header information HD are stored in the first storage unit 20MA.

If the content of the definition file CONF or the header information HD is rewritten from the initial state, the definition information return unit 41C returns the content of the definition file CONF or the header information HD to the default content as necessary. The default content of the definition file CONF or the header information HD is the content of the definition file CONF or the header information HD stored in the second storage unit 20 MB of the controller 20 or the like as described above. The definition information return unit 41C writes the definition file CONF or the header information HD stored in the second storage unit 20 MB over the definition file CONF or the header information HD stored in the first storage unit 20MA to return these contents to the default contents. Consequently, even after the definition file CONF or the header information HD is rewritten, it can be easily returned to its default content.

The trigger information generation unit 41D generates trigger information for storing in the first storage unit 20MA the work machine information MI detected by the various sensors group 31, the location detection device 33, or the like. The trigger information corresponds to an event that occurred on the work machine 1 (the event described below). The access system 41 transmits the trigger information generated by the trigger information generation unit 41D to the controller 20 or the like. The access system 41 then transmits the definition file CONF or the header information HD to the vehicle-mounted system 1S. The processing unit 20C generates the work machine data MID from the collected work machine information MI and stores the work machine data MID in the first storage unit 20MA.

The converter 42 acquires the work machine data MID acquired by the data retrieval unit 41A of the access system 41 from the first storage unit 20MA of the controller 20 or the like of the work machine 1 and stored in the storage device 41M. The converter 42 converts the acquired work machine data MID into a form that an operator of the management system 40 can understand. At this point, the converter 42 uses, for example, the analysis tool 43 to analyze the work machine data MID and displays the result on a display device 42D. The analysis tool 43 is software that graphs the work machine data MID and displays the work machine data MID on the display device 42D and that performs a statistical process on the work machine data MID.

The definition generator 44 generates the content of the definition file CONF or the header information HD. The processing unit 20C included in the controller 20 or the like of the work machine 1 interprets the contents described in the definition file CONF and the header information HD to generate the work machine data MID from the collected work machine information MI. The definition file CONF or the header information HD is changed to change the kind of the work machine information MI contained in the work machine data MID generated by the processing unit 20C or the number of the data.

<Collection of Work Machine Information MI>

Figure 3:
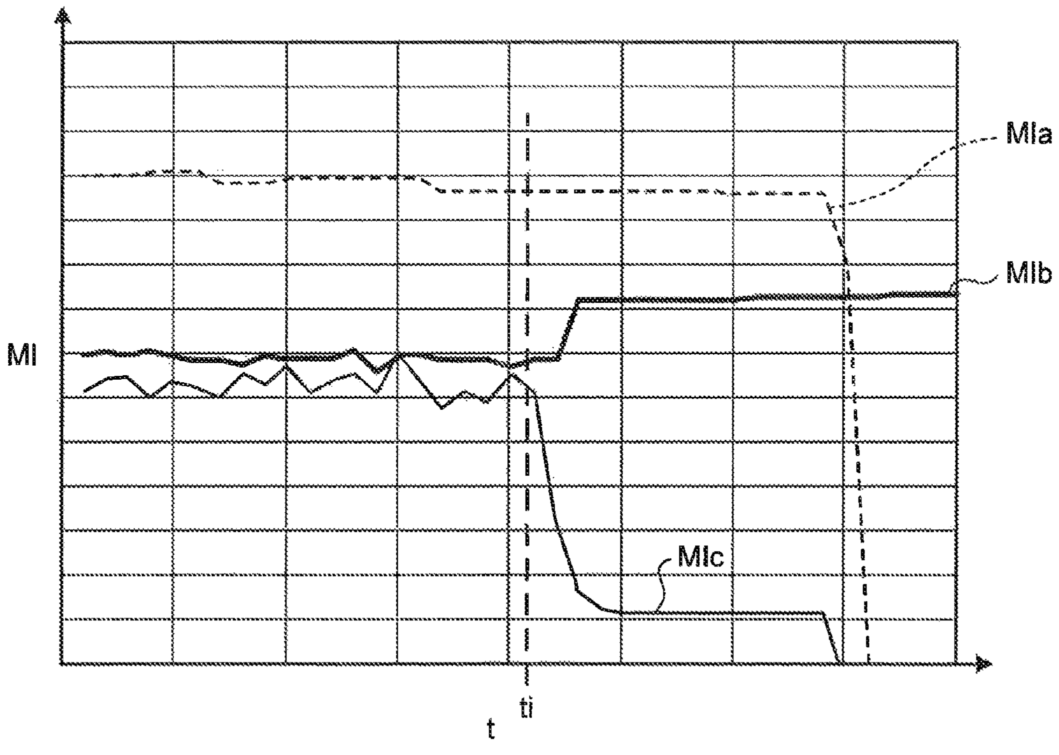
FIG. 3 is a diagram illustrating a relationship between work machine information and time.
Figures 4, 5:
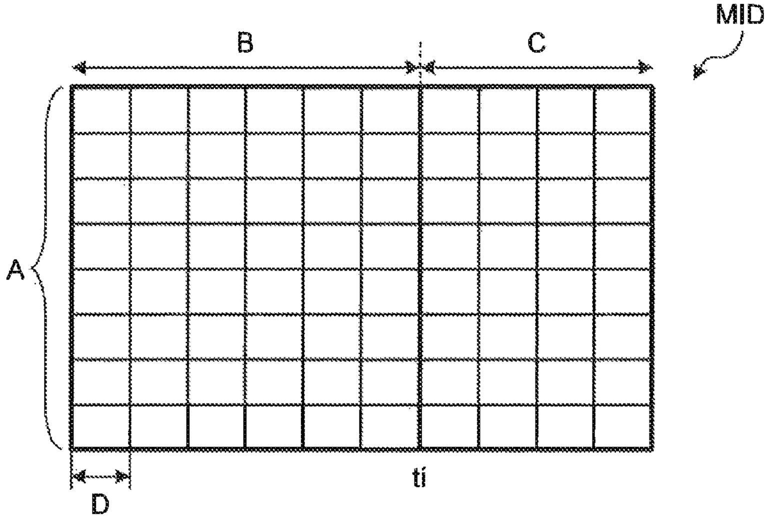
FIG. 4 is a diagram illustrating an example of a form when saving the work machine information in a first storage unit.
FIG. 5 is a diagram illustrating an example where conditions when storing the work machine information in the first storage unit are changed.

FIG. 3 is a diagram illustrating a relationship between the work machine information MI and time t. FIG. 4 is a diagram illustrating an example of a form when saving the work machine information MI in the first storage unit 20MA. FIG. 5 is a diagram illustrating an example where conditions when storing the work machine information MI in the first storage unit 20MA are changed. In the embodiment, the processing unit 20C of the controller 20 or the like included in the work machine 1 collects the work machine information MI and stores the work machine information MI in the first storage unit 20MA during the operation of the work machine 1. If some event occurs on the work machine 1, then the processing unit 20C generates the work machine data MID, the work machine information MI prior to and subsequent to the occurrence of the event in accordance with the conditions described in the definition file CONF and the header information HD, and stores the work machine data MID in the first storage unit 20MA.

During the operation of the work machine 1 is, if an ignition key is used for the key switch 32, a period from a time when the key switch 32 illustrated in FIG. 2 is turned on by the ignition key to a time when the key switch 32 is turned off. The time when the key switch 32 is turned on also includes a case where the key switch 32 is only operated to a position of what is called an accessary to cause the power supply 37 to apply power to an unillustrated electrical component such as a headlamp without starting the engine. The event that occurs on the work machine 1 (hereinafter appropriately referred to as the event) indicates, for example, some failure that occurs on the work machine 1 (regardless of whether hardware or software), or excess of the engine coolant temperature, hydraulic oil temperature, or the like over a preset predetermined threshold value. In other words, in the embodiment, the event does not indicate only a failure that occurs on the work machine 1 but also includes one that shows a sign of a failure even if the failure has not occurred yet. In the embodiment, if the event occurs on the work machine 1, the processing unit 20C of the controller 20 or the like generates the work machine data MID from the work machine information MI at predetermined times before and after the occurrence of the event and stores the work machine data MID in the first storage unit 20MA.

The horizontal axis of FIG. 3 represents time t and the vertical axis thereof represents the size of the physical quantity of the work machine information MI. In the example illustrated in FIG. 3, the event occurred on the work machine 1, for example, at time ti. In this example, the physical quantities of the work machine information MIa, MIb, and MIc subsequent to the time ti when the event occurred are changed compared with the statuses prior to the time ti when the event occurred. The cause of the event can be determined by analyzing the work machine information MI at predetermined times prior to and subsequent to the time ti when the event occurred. In the embodiment, if the event occurs on the work machine 1, the processing unit 20C of the controller 20 or the like causes, for example, the trigger information (hereinafter appropriately referred to as the trigger). The trigger can be received through the in-vehicle communication line 30 by the processing units 20C of all of the controller 20 and the like, which are connected to the in-vehicle communication line 30. The trigger is information for storing in the first storage unit 20MA at least one kind of or at least part of the work machine information MI prior to and subsequent to the event. The processing unit 20C, which has received the occurrence of the trigger, generates the work machine data MID in accordance with the conditions described in the definition file CONF and the header information HD of the first storage unit 20MA and stores the work machine data MID in the first storage unit 20MA. The number C of data subsequent to the trigger is set to be one and the number B of data prior to the trigger is set to be multiple. Accordingly, the work machine data MID can store only information prior to the trigger information. Alternatively, the number B of data prior to the trigger is set to be one and the number C of data subsequent to the trigger is set to be multiple. Accordingly, the work machine data MID can store only information subsequent to the trigger information.

One set of the work machine data MID contains at least one piece of the work machine information MI of at least one kind. As illustrated in FIG. 4, the size of the work machine data MID is determined based on the number A of kinds of the work machine information MI (number of information kinds), the number B of data prior to the trigger, the number C of data subsequent to the trigger, and sampling time D. ti illustrated in FIG. 4 is, as described above, the time when the event occurred. The number B of data prior to the trigger is the number of pieces of the work machine information MI collected by the processing unit 20C prior to the trigger (the number per kind of the work machine information MI). The number C of data subsequent to the trigger is the number of pieces of the work machine information MI collected by the processing unit 20C subsequent to the trigger (the number per kind of the work machine information MI). The sampling time D is a time interval during which the processing unit 20C collects the work machine information MI.

The work machine data MID is stored in a predetermined storage area assigned in the first storage unit 20MA. The size of a storage area (storage capacity) of the first storage unit 20MA allocated to one set of the work machine data MID is finite. Assuming that the size is A×(B+C), the length of time L during which the work machine information MI to be recorded in one set of the work machine data MID is collected (appropriately referred to as the recording time) changes depending on the size of the sampling time D as illustrated in FIG. 5. For example, if the sampling time D is 50 ms (milliseconds), the recording time L is 6000 ms, in other words, six seconds. Moreover, as illustrated in FIG. 5, if the number A of information kinds is increased, the number B of data prior to the trigger and the number C of data subsequent to the trigger are reduced. If the number A of information kinds is reduced, the number B of data prior to the trigger and the number C of data subsequent to the trigger are increased. The number A of information kinds, the number B of data prior to the trigger, the number C of data subsequent to the trigger, and the sampling time D are referred to as the storage conditions for convenience. At least one of the storage conditions is changed to enable a change in the number of kinds of information (the number of information kinds) contained in the work machine data MID, a change in the recording time L, and a change in the density of the recorded work machine information MI (the number of pieces of the work machine information MI per unit time).

In the embodiment, the controller 20 or the like can set or change at least one of the number B of data prior to the trigger, the number C of data subsequent to the trigger, and the sampling time D out of the storage conditions (if the number A of information kinds can be changed, at least one of them further including the number A of information kinds) from the outside of the controller 20 or the like. This is because, as described above, the definition file CONF and the header information HD for setting the storage conditions are stored in the first storage unit 20MA where the stored information can be rewritten and accordingly these contents can be easily rewritten from the outside of the controller 20 or the like.

At least one of the number B of data prior to the trigger, the number C of data subsequent to the trigger, and the sampling time D are configured to be settable or changeable from the outside of the controller 20 or the like, for example, the management system 40, and accordingly, the limited storage capacity of the storage unit, specifically the storage capacity of the first storage unit 20MA can be effectively used. In other words, if the recording time L is desired to be extended at the cost of the density of the work machine information MI, the sampling time D is enlarged to enable the extension of the recording time L as illustrated in FIG. 5. In the embodiment, a total (B+C) of B and C is constant and therefore, if the number B of data prior to the trigger is desired to be increased, the number B is increased and the number C of data subsequent to the trigger is reduced and, if the number C of data subsequent to the trigger is desired to be increased, the number C is increased and the number B of data prior to the trigger is reduced. The recording time L can be short, but if the density of the work machine information MI is desired to be high, the sampling time D is reduced. In this manner, in the embodiment, the storage condition can be changed from the outside of the controller 20 or the like. Accordingly, the storage condition is changed depending on the kind of event to facilitate the operator of the management system 40 collecting an appropriate number of pieces of the work machine information MI in an appropriate recording time while there is a limit to the storage capacity of the first storage unit 20MA. As a consequence, the work machine 1, and the controller 20 and the like effectively use the limited hardware resources, specifically the storage capacity of the first storage unit 20MA, and can make effective use of the work machine data MID.

In the embodiment, it may be further configured such that the number A of information kinds can be set or changed. In other words, it may be configured such that at least one of the number A of information kinds, the number B of data prior to the trigger, the number C of data subsequent to the trigger, and the sampling time D can be set or changed. For example, if it is desired to obtain as many kinds of the work machine information MI as possible at the cost of their respective numbers (B+C) of pieces of the work machine information MI, the number A of information kinds is increased, and at least one of the number B of data prior to the trigger and the number C of data subsequent to the trigger is reduced. Moreover, if it is desired to obtain many kinds of the work machine information MI over a long time at the cost of the density of the work machine information MI, the number A of information kinds and the sampling time D are increased and at least one of the number B of data prior to the trigger and the number C of data subsequent to the trigger is reduced. In this manner, the number A of information kinds is also configured to be settable or changeable from the outside of the controller 20 or the like. Accordingly, it becomes easy for the operator of the management system 40 to collect an appropriate number and kind of the work machine information MI in an appropriate recording time while there is a limit to the storage capacity of the first storage unit 20MA. As a consequence, the work machine 1, and the controller 20 and the like effectively use the limited hardware resources, and can make more effective use of the work machine data MID. At least one of the number B of data prior to the trigger, the number C of data subsequent to the trigger, and the sampling time D (if there is the number A of information kinds, at least one of them including the number A) can be set or changed by rewriting the definition file CONF or the header information HD where they are described.

Figure 6:
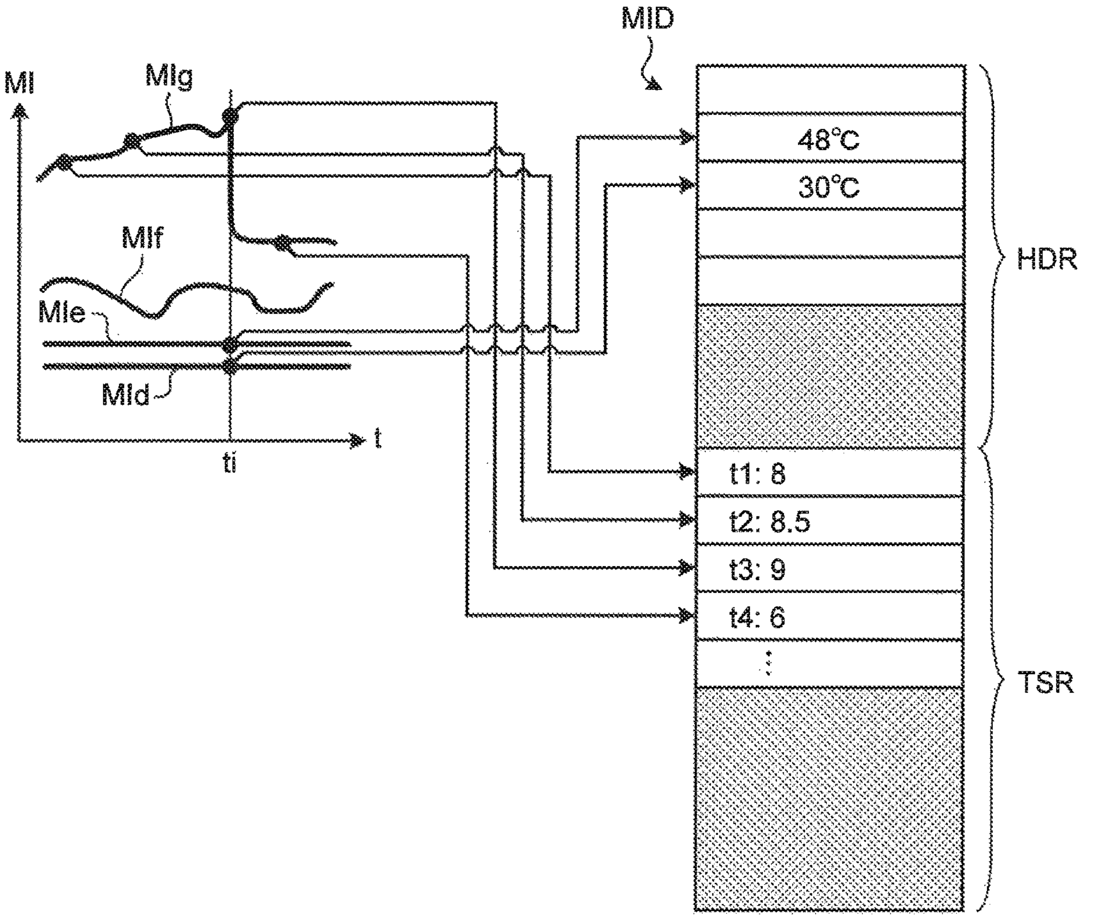
FIG. 6 is a diagram illustrating an example of the structure of work machine data and areas for storing work machine information MI.

FIG. 6 is a diagram illustrating an example of the structure of the work machine data MID and areas for storing the work machine information MI. In the example illustrated in FIG. 6, the trigger occurred at time ti. In the embodiment, the work machine data MID has a data structure including a header information storage area HDR and a chronological data storage area TSR. The header information storage area HDR is provided at the top of the chronological data storage area TSR. The work machine information MI specified by the header information HD is stored in the header information storage area HDR. The chronological data is at least one kind out of a plurality of kinds of the work machine information MI collected at a plurality of times with the lapse of time t. The chronological data is a group of the work machine information MI collected at a plurality of times among the plurality of kinds of the work machine information MI, the group having been selected and stored in the first storage unit 20MA. In the example illustrated in FIG. 6, work machine information MIg corresponds to the chronological data. Four pieces of the work machine information MIg are collected with the lapse of the time t, and are respectively stored in the chronological data storage area TSR in the descending order of acquisition. FIG. 6 illustrates that time passes from t1 to t2, t3, and t4, and the physical quantities indicated by the work machine information MIg at the respective times are 8.5, 9, and 6. Similarly to an input signal input through the in-vehicle communication line 30 to the controller 20 or the like, or a state variable used in the controller 20 or the like, the work machine information MI that suddenly changes with the lapse of time t chronologically stores values prior to and subsequent to the time ti when the trigger occurred, as the chronological data, in the chronological data storage area TSR. Work machine information MIf illustrated in FIG. 6 changes very much with the lapse of time t. Accordingly, the work machine information MIf is selected as the chronological data and stored in the chronological data storage area TSR of the work machine data MID.

The work machine information MI stores the chronological data in the chronological data storage area TSR and stores data at the time of the trigger in the header information storage area HDR. In terms of the data at the time of the trigger, one collected at the time of the occurrence of the trigger is selected from the work machine information MI, and the number of the work machine information MI per kind is less than the number of the chronological data. The physical quantity, for example, temperature such as air temperature or hydraulic oil temperature, or atmospheric pressure is the operating machine information MI having a property that does not change suddenly in a short time with the lapse of time t. Such operating machine information MI is stored as the data at the time of the trigger in the header information storage area HDR of the work machine data MID. In the example illustrated in FIG. 6, work machine information MId and MIe that do not change suddenly with the lapse of time t is selected as the data at the time of the trigger and stored in the header information storage area HDR. The header information storage area HDR is an area where at least information for interpreting the chronological data among the work machine data MID is described. The information for interpreting the chronological data is, for example, a time when software for generating the work machine data MID starts up, the effective number of data prior to the trigger, and the effective number of data subsequent to the trigger. For example, the converter 42 of the management system 40 illustrated in FIG. 2 interprets a plurality of pieces of the work machine information MI stored in the chronological data storage area TSR while referring to the information for interpreting the chronological data stored in the header information storage area HDR of the work machine data MID.

In the example illustrated in FIG. 6, the number of data at the time of the trigger corresponding to the work machine information MId or MIe is one at the time of the occurrence of the trigger. The number of the chronological data corresponding to the work machine information MIg is four corresponding to the times t1, t2, t3, and t4. In other words, the total number of the data at the time of the trigger corresponding to one kind of the work machine information MI is less than the total number of the chronological data corresponding to one kind of the work machine information MI. In the embodiment, out of the plurality of kinds of the work machine information MI, the processing unit 20C stores those having a property where a change is large with the lapse of time t in the chronological data storage area TSR of the work machine data MID and stores those having a property where a change is small with the lapse of time t in the header information storage area HDR of the work machine data MID. Consequently, the work machine data MID can enlarge the chronological data storage area TSR that stores the chronological data that needs a large storage capacity. In other words, the work machine data MID can secure a large storage capacity for the work machine information MI that is desired to grasp a change with the lapse of time and accordingly can store and provide more chronological data prior to and subsequent to the occurrence of the trigger. As a consequence, the work machine 1, and the controller 20 and the like effectively use the limited hardware resources, specifically the first storage unit 20MA, and can make effective use of the work machine data MID. Those having a property where a change is small with the lapse of time t may be set as the chronological data on purpose by arbitrarily setting the header information HD, which is described below. For example, if there is the work machine information MI that is desired to be checked, and it is desired to check whether or not its physical quantity really has the property where a change is small with the lapse of time t, such a setting is performed to enable the check of the size of the change.

It is sufficient if the number of the data at the time of the trigger per kind of the work machine information MI is less than the number of the chronological data, but it is preferred that the number be set to be one at the time of the occurrence of the trigger. Consequently, the work machine data MID can secure a larger storage capacity for the chronological data and accordingly can use the limited hardware resources effectively and make more effective use of the work machine data MID. It is sufficient if the data at the time of the trigger is those where a change is small with the lapse of time t, but it is preferred that the data at the time of the trigger include at least one of air temperature and atmospheric pressure in an environment where the work machine 1 is used, and the location information of the work machine 1. This is because they are useful information when analyzing the event that occurred on the work machine 1 and information that hardly changes in a short time between before and after the occurrence of the event on the work machine 1. The work machine data MID stores such work machine information MI as the data at the time of the trigger in the header information storage area HDR to make it possible to secure the work machine information MI useful for the analysis of the event and provide more chronological data. Especially if the work machine 1 is an excavator or a dump truck, the location information of the work machine 1 hardly changes with the lapse of time t at the time of the loading or unloading work performed by the work machine 1.

The kind of the data at the time of the trigger, and the like, which are stored in the header information storage area HDR, can be set or changed by rewriting the header information HD stored in the first storage unit 20MA from the outside of the controller 20 or the like. In other words, the header information HD is definition information for generating the work machine data MID containing the chronological data and the data at the time of the trigger. The header information HD is set to store the work machine information MI where a change is small with the lapse of time t in the header information storage area HDR of the work machine data MID. The processing unit 20C interprets the header information HD when generating the work machine data MID and stores the work machine information MI specified by the header information HD in the header information storage area HDR of the work machine data MID.

If the work machine information MI stored in the header information storage area HDR of the work machine data MID is changed, for example, the definition information change unit 41B of the access system 41 included in the management system 40 accesses the first storage unit 20MA of the controller 20 or the like via the server 103, the communication line 101, the base station 102, and the communication unit 34 of the work machine 1. The definition information change unit 41B then transmits to the work machine 1 new header information HD changed by the definition generator 44 of the management system 40 and writes the new header information HD over the header information HD stored in the first storage unit 20MA. Consequently, the kind of the data at the time of the trigger, and the like, which are stored in the header information storage area HDR, are changed. The definition information change unit 41B of the access system 41 can change, by the above-described method, not only the kind of the data at the time of the trigger but also the header information HD other than the kind of the data at the time of the trigger. The kind of the data at the time of the trigger, and the like, which are stored in the header information storage area HDR, may be set to be described in the above-described definition file CONF and changed by changing the definition file CONF.

The work machine 1 stores the definition file CONF where the storage conditions of the work machine data MID are described and the header information HD that describes the kind of the data at the time of the trigger, and the like, which are stored in the header information storage area HDR, in the first storage unit 20MA where the stored information can be rewritten. The work machine 1 is configured to be capable of accessing and rewriting the first storage unit 20MA from the outside of the controller 20 or the like and accordingly the storage condition of the work machine data MID or the kind of the data at the time of the trigger can be easily changed. As a consequence, for example, the degree of freedom when the management system 40 collects the work machine information MI required for the analysis of the event is increased and convenience upon the analysis of the event that occurred on the work machine 1 is improved.

In other words, if the event that occurred on the work machine 1 is a breakdown, the storage condition of the work machine data MID or the kind of the data at the time of the trigger is changed to analyze the cause of the breakdown and the obtained work machine data MID is analyzed to facilitate the identification of the cause of the breakdown. Moreover, even if the event is not a breakdown, the storage condition of the work machine data MID or the kind of the data at the time of the trigger is changed and the obtained work machine data MID is analyzed to facilitate the grasp of the operation status of the work machine 1, the determination of the necessity of maintenance, and the like.

For example, if the work machine 1 where the event occurred performs a test operation, the storage condition of the work machine data MID or the kind of the data at the time of the trigger is changed during the stop of the work machine 1, in other words, while the engine is being stopped, and accordingly the management system 40 can collect many sets of the work machine data MID. Moreover, similarly, if the work machine 1 performs a test operation, also when the analysis progresses to a certain degree, the work machine information MI having a large influence on the occurrence of the event is becoming known, and then the sampling time D is reduced to make a more detailed analysis on such work machine information MI, the storage condition can be changed from the outside of the controller 20 or the like and accordingly the analysis can be made easily.

<Definition File CONF>

FIG. 7 is a diagram illustrating an example of the definition file CONF. As illustrated in FIG. 7, the definition file CONF includes a plurality of (four in this example) areas RC1, RC2, RC3, and RC4. In the embodiment, the definition file CONF describes definitions C1, C2, and C3 about three kinds of storage conditions, and the like as illustrated in the items. The number of the definitions C1, C2, and C3 described in the definition file CONF is not limited but may be single or multiple. The area of the area RC1 sets a work area of the first storage unit 20MA where the work machine information MI and the work machine data MID are stored. TGM1 and TGM2 of the area RC1 set conditions on which the controller 20 or the like creates a trigger.

In the case of the definition C1 or C2 in FIG. 7, NO is illustrated in TGM1. However, this means that even if any event occurs, it is recognized as at the time of the trigger. Moreover, in a case of the definition C3 in FIG. 7, Specified is illustrated in TGM1. However, this means that if a specified error code occurs, it is assumed to be recognized as at the time of the trigger taking it as the event. Therefore, if TGM1 shows NO, nothing is described in TGM2. However, if TGM1 shows Specified, the specified error cord is described in TGM2. A combination of alphanumerics such as “E02” is used as the error code, and the error code is described in TGM2 of FIG. 7. TGM1 and TGM2 are changed and accordingly it is possible to set so as, for example, to recognize the time when accepting the error code as at the time of the trigger and to recognize a case where the work machine information MI exceeds a predetermined threshold value as at the time of the trigger.

The area RC2 describes the storage conditions of the work machine data MID. The mode sets a mode to store the work machine data MID in the first storage unit 20MA. The mode is, for example, an overwrite mode to overwrite from the old work machine data MID if the area to store the work machine data MID in the first storage unit 20MA becomes full, or a protection mode not to overwrite even if the area to store the work machine data MID becomes full. The number A of information kinds, the number B of data prior to the trigger, the number C of data subsequent to the trigger, and the sampling time D in the area RC2 are rewritten to be changed. The definition generator 44 of the management system 40 illustrated in FIG. 2 generates the number A of information kinds, the number B of data prior to the trigger, the number C of data subsequent to the trigger, and the sampling time D, and checks whether or not their values fall within the work area.

The areas RC3 and RC4 define a specific variable name or variable address of the work machine information MI. In other words, the area RC3 describes the kind of each work machine information MI stored in the work machine data MID. The kind of the work machine information MI can be changed. In this example, the definition file CONF can set k (k is an integer) pieces of the work machine information MI at the maximum (see FIG. 8). The work machine information MI includes, for example, engine speed, hydraulic oil pressure, voltage across the power supply 37, or vehicle speed. In addition, the work machine information MI includes voltage across an accessary power supply, the output voltage across an alternator, an input to the controller 20 or the like, an output instruction of the controller 20 or the like, or the like. The area RC4 describes a memory address where the work machine information MI exists when the work machine data MID is generated. The memory address is the address of a variable described in the computer program PG stored in the second storage unit 20 MB or the third storage unit 20MC. At the time of generating the work machine data MID, the processing unit 20C generates the work machine data MID based on the information described respectively in the areas RC1 to RC4 of the definition file CONF and stores the work machine data MID at a predetermined address of the first storage unit 20MA.

One set of the work machine data MID has one combination of the number A of information kinds, the number B of data prior to the trigger, the number C of data subsequent to the trigger, and the sampling time D. In other words, one set of the work machine data MID can contain a plurality of pieces of the work machine information MI, but the combinations of the number B of data prior to the trigger, the number C of data subsequent to the trigger, and the sampling time D cannot be changed among the pieces of the work machine information MI. However, the combinations of the number B of data prior to the trigger, the number C of data subsequent to the trigger, and the sampling time D can be changed between different sets of the work machine data MID. In the embodiment, the first storage unit 20MA can store a plurality of the work machine data MID and the definition files CONF as described above. Hence, the processing unit 20C can generate, for the same kind of work machine information MI, a plurality of different work machine data MID whose combinations of the number B of data prior to the trigger, the number C of data subsequent to the trigger, and the sampling time D are different.

For example, for the same kind of work machine information MI, the sampling time D is reduced in one definition file CONF and the sampling time D is increased in another definition file CONF. The processing unit 20C generates the work machine data MID in accordance with each of the above-described two kinds of definition files CONF when generating the work machine data MID. The obtained one set of the work machine data MID stores detailed information prior to and subsequent to the trigger, and the other set of the work machine data MID has a longer recording time L. As a consequence, for the same kind of work machine information MI, the same event that occurred at the same time can be observed at different data densities. In the above-described example, the sampling times D are different, but the generation of the work machine data MID by using a plurality of the definition files CONF is not limited to the above-described example.

For example, even if the work machine 1 is in the same vehicle size class, the settings of the storage condition and the kind or number of the work machine information MI may be changed in the definition file CONF in accordance with the environment where the work machine 1 is used (climate, use in a residential area, use in a mountainous area, and the like). Moreover, the settings of the storage condition and the kind or number of the work machine information MI may be changed for each shipping lot of the work machine 1. Consequently, even if the work machine information MI required is different depending on the environment where the work machine 1 is used, it is possible to deal with it easily. The header information HD shall be dealt with in the same manner as the definition file CONF.

In the above-described example, the definition file CONF or the header information HD is changed via the access system 41 of the management system 40. However, the embodiment is not limited to this, but, for example, an information rewriting device may be connected to the service connector 35 to rewrite the definition file CONF or the header information HD stored in the first storage unit 20MA via the in-vehicle communication line 30. Consequently, even in an environment where the work machine 1 and the management system 40 cannot communicate with each other by wireless communication or the communication line 101, the definition file CONF or the header information HD can be easily changed.

<Work Machine Data MID>

FIG. 8 is a diagram illustrating an example of the work machine data MID. In the embodiment, the work machine data MID describes the storage conditions and the like, respectively, for the definitions C1, C2, and C3 of the three kinds of storage conditions and the like. The number of the definitions C1, C2, and C3 of the three kinds of storage conditions and the like described in the work machine data MID is not limited, but may be single or multiple. In the example illustrated in FIG. 8, items corresponding to the definitions C1, C2, and C3 about their respective three kinds of storage conditions and the like are empty, but the actual work machine data MID describes the work machine information MI collected by the processing unit 20C in the above-described empty items.

The work machine data MID includes the header information storage area HDR and the chronological data storage area TSR. The header information storage area HDR includes a first area HDR1, a second area HDR2, and a third area HDR3. The first area HDR1 describes, for example, the effective number ED_BT of data prior to the trigger, the effective number ED_AT of data subsequent to the trigger, the time ON_TIME when the computer program PG for starting the generation of the work machine data MID starts up, and the time B_SC indicating a time to separate between the number B of data prior to the trigger and the number C of data subsequent to the trigger.

The work machine information MI at the time of the occurrence of the trigger, in other words, n (n is an integer) sets of data at the time of the trigger HV1, HV2, . . . HVn are described in the second area HDR2 in accordance with the header information HD. Times HVT1, HVT2, . . . HVTn when the processing unit 20C collects the data at the time of the trigger HV1, HV2, . . . HVn are described in the third area HDR3. The work machine information MI (MI1, MI2, . . . MIk) collected by the processing unit 20C is described in the chronological data storage area TSR in accordance with the definition file CONF.

The kind and memory address of the work machine information MI described in the areas RC3 and RC4 of the definition file CONF illustrated in FIG. 7 are rewritten from the outside of the controller 20 or the like to change the work machine information MI stored in the chronological data storage area TSR illustrated in FIG. 8. Moreover, the work machine information MI specified by the header information HD is rewritten from the outside of the controller 20 or the like to change the work machine information MI stored in the header information storage area HDR of the work machine data MID.

If the work machine 1 includes the plurality of controllers 20 and 21, each of the controllers 20 and 21 can set or change the storage conditions, and the definition file CONF and the header information HD as the definition information individually. Consequently, the controllers 20 and 21 can acquire the work machine information MI according to their respective control targets on appropriate conditions for their respective control targets and generate the work machine data MID.

<Change of Condition to Collect Work Machine Information MI>

Figure 9:
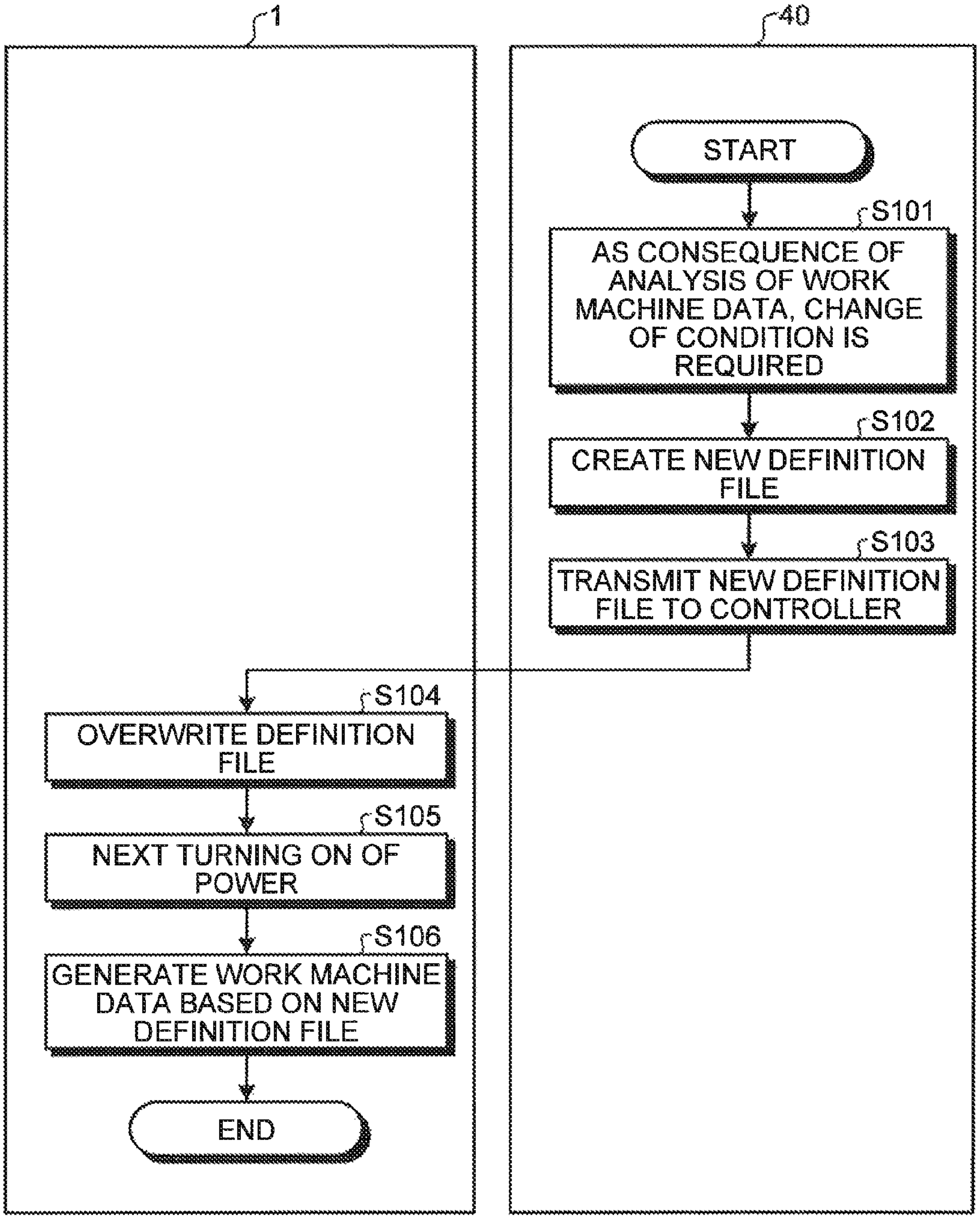
FIG. 9 is a flowchart illustrating an example of a procedure for changing a condition to collect the work machine information.

FIG. 9 is a flowchart illustrating an example of a procedure for changing the condition to collect the work machine information MI. In the example, a description will be given of an example where the definition file CONF stored in the first storage unit 20MA is rewritten to change the storage condition and the like, but the same shall apply to the header information HD. In Step S101, it is assumed that as a consequence of the analysis of the work machine data MID by the operator of the management system 40, the necessity to change the storage condition and the like of the controller 20 included in the work machine 1 arises. In this case, the operator proceeds to Step S102 and operates the definition generator 44 of the management system 40 illustrated in FIG. 2 to create a new definition file CONF. In Step S103, the definition information change unit 41B of the access system 41 transmits the new definition file CONF to the controller 20 by wireless communication through the communication line 101 and the communication unit 34 of the work machine 1. Such use of wireless communication enables an easy rewrite of the content of the definition file CONF even if the management system 40 and the work machine 1 are apart from each other.

Next, in Step S104, the processing unit 20C of the controller 20, which has received the new definition file CONF, writes the new definition file CONF over the existing definition file CONF stored in the first storage unit 20MA. When the processing unit 20C overwrites the new definition file CONF, the power to the controller 20 needs to be on, in other words, the key switch 32 needs to be on. If the key switch 32 is not on, the start-up control unit 36B included in the input/output device 36 of the work machine 1 turns on the key switch 32 via the in-vehicle communication line 30 when detecting an access from the access system 41, and turns on (powers up) the controller 20.

Even if the definition file CONF is rewritten in the state where the power to the controller 20 is on, the content of the new definition file CONF is not yet effective. In Step S105, after the definition file is rewritten to the new definition file CONF, the power to the controller 20 is temporarily turned off. When the power to the controller 20 is turned on again, the content of the new definition file CONF becomes effective. In Step S106, the processing unit 20C generates the work machine data MID in accordance with the content of the new definition file CONF. Consequently, the content of the definition file CONF is rewritten.

If the definition file CONF is rewritten when the work machine 1 is not being used, the start-up control unit 36B turns on the key switch 32 via the in-vehicle communication line 30 when detecting an access to rewrite the definition file CONF from the access system 41, and turns on (powers up) the controller 20. The processing unit 20C of the controller 20 receives the new definition file CONF, writes and replaces the new definition file CONF over and with the existing definition file CONF stored in the first storage unit 20MA. Upon the completion of overwrite, the start-up control unit 36B turns off the key switch 32 via the in-vehicle communication line 30 and turns off the controller 20. Consequently, next time the key switch 32 of the work machine 1 is turned on, the content of the new definition file CONF can be made effective.

<Operation of Controller 20 or the Like>

Figure 10:
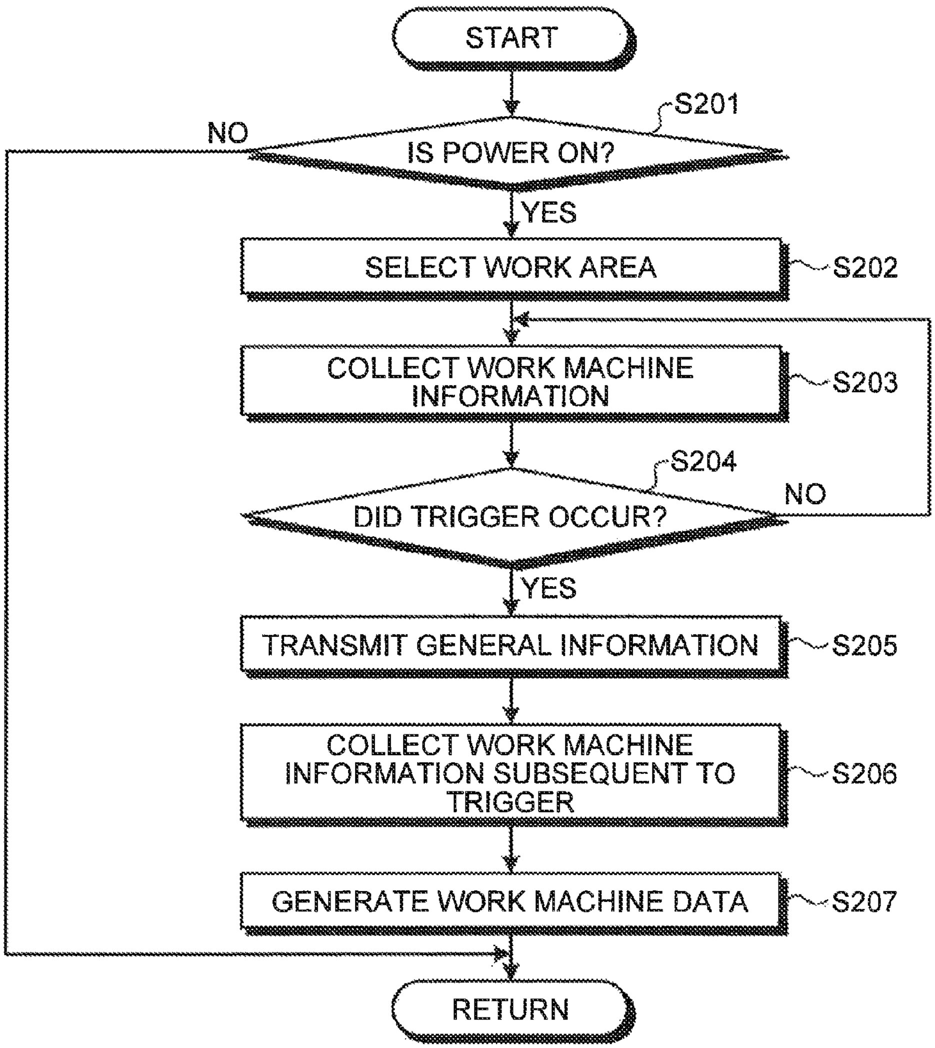
FIG. 10 is a flowchart illustrating an operation example of a controller included in a work machine 1.
Figure 11:
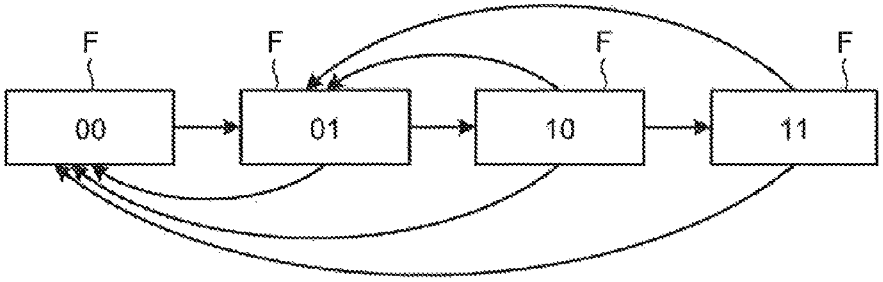
FIG. 11 is a diagram illustrating a transition example of a process flag when storing the work machine information and work machine data MID in the first storage.

FIG. 10 is a flowchart illustrating an operation example of the controller 20 or the like included in the work machine 1. FIG. 11 is a diagram illustrating a transition example of a process flag F when storing the work machine information MI and the work machine data MID in the first storage unit 20MA. In Step S201, if the key switch 32 illustrated in FIG. 2 is not on (Step S201, No), the work machine 1 is not operating, and accordingly the controller 20 or the like does not collect the work machine information MI and does not generate the work machine data MID, either.

In Step S201, if the key switch 32 illustrated in FIG. 2 is turned on and the controller 20 or the like is powered up (Step S201, Yes), the work machine 1 is during operation. In this case, the processing unit 20C starts the computer program PG for generating the work machine data MID. In Step S202, the processing unit 20C selects a work area to store the collected work machine information MI. The work area is an area of the first storage unit 20MA, where the work machine information MI is stored before the occurrence of the trigger. If the key switch 32 is turned on, the processing unit 20C interprets the header information HD stored in the first storage unit 20MA and selects the work area. The process flag F is 00 in the state where the work area has been selected as illustrated in FIG. 11.

Next, the processing unit 20C proceeds to Step S203 and starts the collection of the work machine information MI. When starting the collection of the work machine information MI, the processing unit 20C changes the process flag F illustrated in FIG. 11 from 00 to 01. If the process flag F=01, the processing unit 20C is in the state of collecting the work machine information MI, in other words, in the state prior to the occurrence of the trigger. At this point, when the work area to store the collected work machine information MI becomes full, the processing unit 20C deletes the old work machine information MI in turn from the top of the work area and stores the newly collected work machine information MI in turn. Since the work machine information MI continues to be collected unless the trigger occurs, the processing unit 20C executes such a process.

If the trigger did not occur in Step S204 (Step S204, No), the processing unit 20C repeats Steps S203 and S204. If the trigger occurred in Step S204 (Step S204, Yes), the processing unit 20C transmits general information to the management system 40 in Step S205. The general information is information on an outline of the event and, if the occurrence time of the event and the event are an error, includes an error code and the like. Consequently, as illustrated in FIG. 10, the process to transmit the general information to the management system 40, which is illustrated in Step S205, is executed after the occurrence of the trigger, the operator on the management system 40 side can quickly grasp the event of the work machine 1, which is suitable for the management of the work machine 1.

Next, the processing unit 20C proceeds to Step S206 and collects the work machine information MI subsequent to the trigger. Moreover, the processing unit 20C changes the process flag F from 01 to 10 as illustrated in FIG. 11. If the process flag F=10, the processing unit 20C is in a state of collecting the work machine information MI subsequent to the occurrence of the trigger and storing the work machine information MI in the work area of the first storage unit 20MA.

Next, in Step S207, the processing unit 20C generates the work machine data MID based on the definition file CONF and the header information HD and stores the work machine data MID in a predetermined area of the first storage unit 20MA. If the work machine data MID is stored in the first storage unit 20MA, the process flag F is changed from 10 to 11. If the process flag F=11, it is in a state where at least one set of the work machine data MID is stored in the first storage unit 20MA. If a plurality of pieces of the work machine information M1 is stored and the work area is full, the processing unit 20C writes the latest work machine information MI over the oldest work machine information MI.

The order of execution of Steps S205, S206, and S207 may be opposite to the above-described order. In other words, Steps S206, S207, and S205 may be executed in this order. When a series of the procedures is complete, the processing unit 20C once ends the computer program PG for generating the work machine data MID. The processing unit 20C then returns to the start and executes sequentially from Steps S201 to S207.

<Process Example 1 of Information Collection System 100>

Figure 12:
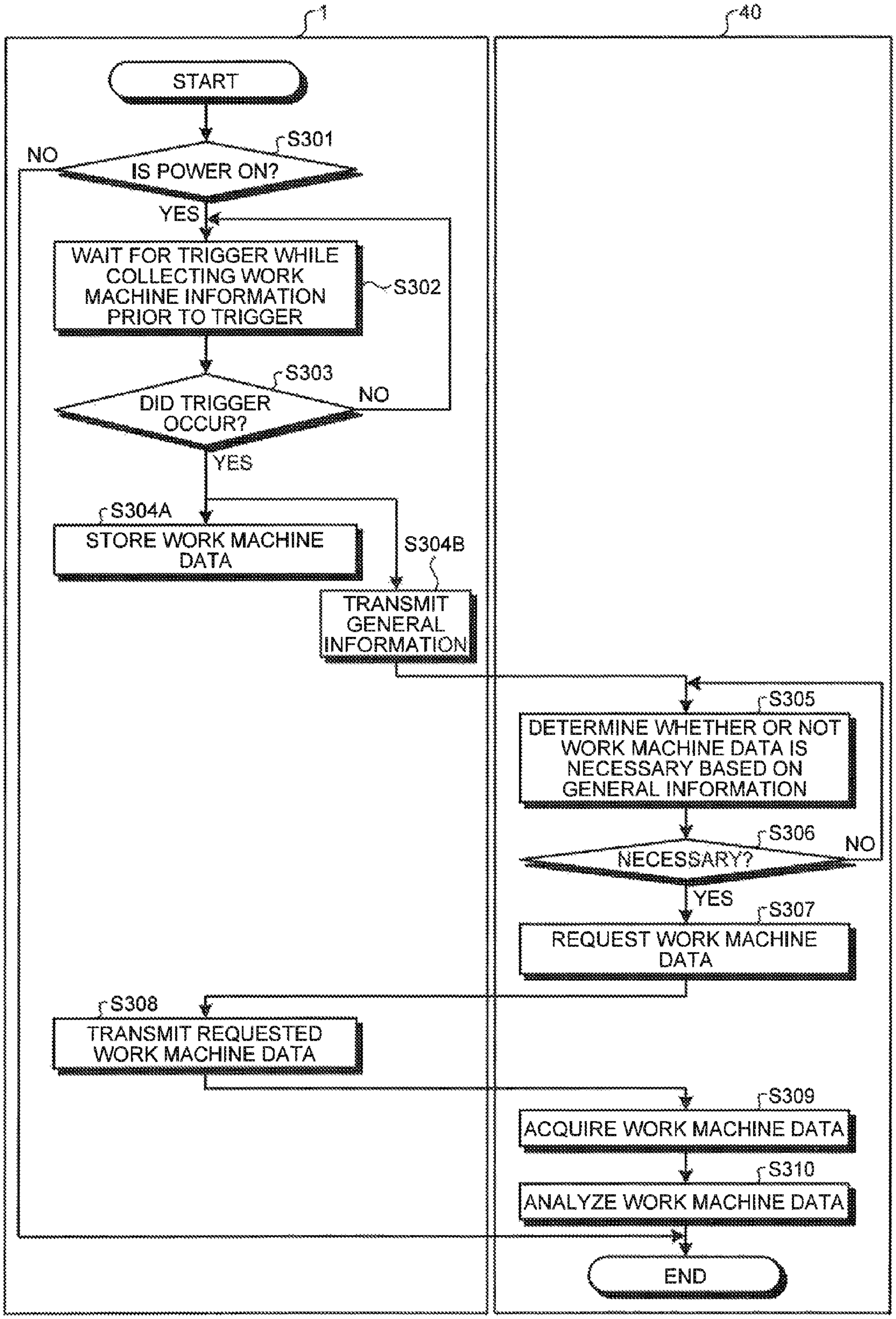
FIG. 12 is a flowchart illustrating a process example of the information collection system.

FIG. 12 is a flowchart illustrating a process example of the information collection system 100. Steps S301 to S304B and S308 are processes of the work machine 1. Steps S305 to S307 and S309 and S310 are processes of the management system 40. Step S301 is similar to the above-described Step S201 and therefore the description will be omitted. In Steps S302 and S303, the processing unit 20C of the work machine 1 waits until the trigger occurs while collecting the work machine information MI. If the trigger occurred (Step S303, Yes), the processing unit 20C proceeds the processing to Steps S304A and S304B.

In Step S304A, the processing unit 20C generates the work machine data MID based on the definition file CONF and the header information HD and stores the work machine data MID in a predetermined area of the first storage unit 20MA. In Step S304B, the processing unit 20C transmits the general information to the management system 40. The general information is as described above. The processing unit 20C repeats Steps S301 to S304B after the transmission of the general information.

The access system 41, which has received the general information, displays on the display device 42D or the like the general information transmitted from, for example, at least one work machine 1. If the general information is transmitted from a plurality of the work machines 1, the display device 42D or the like lists and displays their general information. In Step S305, the generated work machine data MID is determined whether or not to be necessary based on the general information. In the embodiment, the operator who checked the general information by the access system 41 determines whether or not the work machine data MID is necessary, but all sets of the work machine data MID may be acquired by the access system 41. Moreover, the access system 41 may acquire the work machine data MID based on an error code described in the general information. For example, if the general information contains an error code that needs to be urgently dealt with, the access system 41 may acquire the work machine data MID.

In Step S306, if the work machine data MID is not necessary (Step S306, No), the access system 41 repeats Steps S305 and S306 until the next general information is transmitted from the controller 20 or the like. If the work machine data MID is necessary (Step S306, Yes), in Step S307, the access system 41 requests the controller 20 or the like to transmit the work machine data MID via the communication line 101 and the server 103.

In Step S308, the controller 20 or the like, which has received a signal indicating to request the transmission of the work machine data MID, transmits the requested work machine data MID to the access system 41 being the requester. In Step S309, the access system 41 acquires the work machine data MID transmitted from the controller 20 or the like. In Step S310, the converter 42 of the management system 40 analyzes the acquired work machine data MID.

<Process Example 2 of Information Collection System 100>

Figure 13:
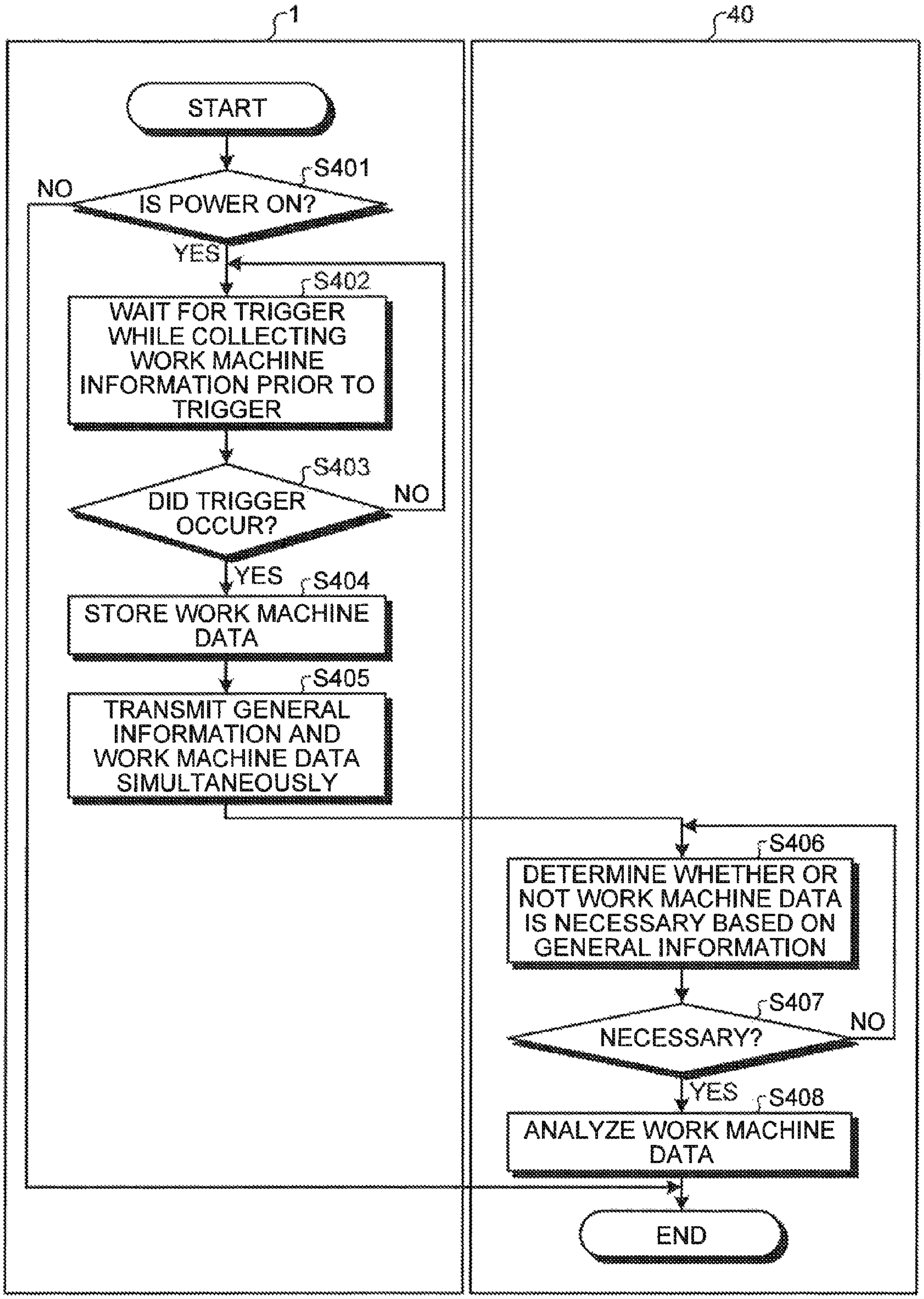
FIG. 13 is a flowchart illustrating a process example of the information collection system.

FIG. 13 is a flowchart illustrating a process example of the information collection system 100. Steps S401 to S405 are processes of the work machine 1. Steps S406 to S408 are processes of the management system 40. Steps S401 to S403 are similar to Steps S301 to S303 of the above-described process example 1 and therefore their descriptions will be omitted.

After the occurrence of the trigger (Step S403, Yes), in Step S404, the processing unit 20C generates the work machine data MID based on the definition file CONF and the header information HD and stores the work machine data MID in a predetermined area of the first storage unit 20MA. In Step S405, the processing unit 20C transmits the general information and the work machine data MID to the management system 40, more specifically the access system 41. The processing unit 20C repeats Steps S401 to S405 after transmitting the general information and the work machine data MID.

The access system 41, which has received the general information and the work machine data MID, displays on the display device 42D or the like the general information transmitted from, for example, at least one work machine 1. If the general information is transmitted from a plurality of the work machines 1, the display device 42D or the like lists and displays their general information. Moreover, the access system 41 temporarily stores the received work machine data MID in the storage device 41M. In Step S406, the work machine data MID transmitted from the controller 20 or the like is determined whether or not to be necessary from at least one of the general information and the work machine data MID. In Step S407, if the work machine data MID is not necessary (Step S407, No), the access system 41 repeats Steps S406 and S407 until the next general information and work machine data MID are transmitted from the controller 20 or the like. The access system 41 may delete unnecessary work machine data MID stored in the storage device 41M. If the work machine data MID is necessary (Step S407, Yes), the converter 42 acquires the work machine data MID from the storage device 41M of the access system 41. The converter 42 proceeds to Step S408 to analyze the acquired work machine data MID.

The embodiment is configured such that when the work machine data MID is generated, the storage condition and the kind of the work machine information MI stored in the header information storage area HDR of the work machine data MID can be set or changed from the outside of the controller 20 or the like. Consequently, it is possible to change at least one of the storage condition and the kind of the work machine information MI stored in the header information storage area HDR in accordance with the kind of the event. Accordingly, while there is a limit to the storage capacity of the first storage unit 20MA, it becomes easy to collect an appropriate number of pieces of the work machine information MI in an appropriate recording time. As a consequence, the work machine 1, and the controller 20 and the like effectively use the limited hardware resources, specifically the storage capacity of the first storage unit 20MA, and can make effective use of the work machine data MID.

Moreover, in the embodiment, the work machine data MID is configured such that the number of data per kind of the work machine information MI stored in the header information storage area HDR is preferably one at the time of the trigger so as to be less than that of the work machine information MI stored in the chronological data storage area TSR. The work machine data MID stores the work machine information MI where a change is small over time in the header information storage area HDR. Consequently, the work machine data MID can secure a large storage capacity for the work machine information MI that is desired to grasp a change with the lapse of time, and accordingly more chronological data prior to and subsequent to the occurrence of the trigger can be stored and provided.

Alternatively, also if it is set to collect only the chronological data prior to or subsequent to the occurrence of the trigger, the work machine data MID can secure a large storage capacity for the work machine information MI that is desired to grasp a change with the lapse of time. Hence, more chronological data prior to or subsequent to the occurrence of the trigger can be stored and provided. As a consequence, the work machine 1, and the controller 20 and the like effectively use the limited hardware resources, specifically the first storage unit 20MA, and can make effective use of the work machine data MID.

Moreover, in the embodiment, the plurality of the controllers 20 and 21 individually collects the work machine information MI and generates the work machine data MID. Consequently, a device that subsequently collects the work machine information MI, respectively, from the controllers 20 and 21 and generates the work machine data MID becomes unnecessary and accordingly a time delay upon the collection of the work machine information MI can be reduced. As a consequence, simultaneity of the work machine information MI and the work machine data MID between the plurality of the controllers 20 and 21 can also be secured.

Up to this point, the embodiment has been described. However, the embodiment is not limited by the above-described content. Moreover, the above-described components include one that can be easily assumed by those skilled in the art, substantially the same one, and one what is called through the doctrine of equivalents. Furthermore, the above-described components can be combined as appropriate. Furthermore, various omissions, replacements, or changes of the components can be made within a range that does not depart from the spirit of the embodiment.

REFERENCE SIGNS LIST

1 Work machine
1S Vehicle-mounted system
2 Work equipment
3 Upper structure
4 Cab
5 Travel device
20, 21 Controller
20C Processing unit
20MA First storage unit
20 MB Second storage unit
20MC Third storage unit
30 In-vehicle communication line
31 Sensors group
32 Key switch
33 Location detection device
34 Communication unit
35 Service connector
36 Input/output device
36A Gateway
36B Start-up control unit
37 Power supply
40 Management system (management system of the work machine)
41 Access system
41A Data retrieval unit
41B Definition information change unit
41C Definition information return unit
41D Trigger information generation unit
41M Storage device
42 Converter
42D Display device
43 Analysis tool
44 Definition generator
100 Information collection system (information collection system of the work machine)
101 Communication line
102 Base station
103 Server
A Number of information kinds
B Number of data prior to the trigger
C Number of data subsequent to the trigger
CONF Definition file
D Sampling time
HD Header information
HDR Header information storage area
L Recording time
MI Work machine information
MID Work machine data
PG Computer program
TSR Chronological data storage area

The invention claimed is:

1. A work machine comprising:

one or more controllers, each controller configured to control an operation of a different component of the working machine, each controller including:

a first memory to store work machine information as information on the work machine and store first definition information;

a second memory to store second definition information; and a processor configured to collect the work machine information and to cause at least one category of the work machine information to be stored in the first memory when a trigger for causing the first memory to start storing the work machine information occurs, wherein the number of pieces of data prior to the trigger, the number of pieces of data subsequent to the trigger, and a time interval, which are to be stored, are described in each of the first definition information and the second definition information, each of the first definition information and the second definition information includes at least one of the number of pieces of data prior to the trigger of the work machine information collected by the processor before the trigger, the number of pieces of data subsequent to the trigger of the work machine information collected by the processor after the trigger, and the time interval during which the work machine information is collected, the second definition information stores default contents of the first definition information, the first definition information has been changed from the second definition information based on an instruction from outside of the controller, and the processor is configured to collect the work machine information in accordance with the number of pieces of data prior to the trigger, the number of pieces of data subsequent to the trigger, and the time interval, which are described in the first definition information that is stored in the first memory and has been changed from the second definition information based on the instruction from outside of the controller.

2. The work machine according to claim 1, wherein the category of the work machine information is changeable.

3. The work machine according to claim 2, wherein the first memory stores the first definition information where the number of pieces of data prior to the trigger, the number of pieces of data subsequent to the trigger, the time interval, and the category of the work machine information, which are to be stored, are described, and the processor saves the collected work machine information in the first memory in accordance with the number of pieces of data prior to the trigger, the number of pieces of data subsequent to the trigger, the time interval, and the category of the work machine information, which are described in the first definition information.

4. The work machine according to claim 1, wherein the first definition information is rewritten from the outside of the controller to change at least one of the number of pieces of data prior to the trigger, the number of pieces of data subsequent to the trigger, and the time interval.

5. The work machine according to claim 3, wherein the first definition information is rewritten from the outside of the controller to change at least one of the number of pieces of data prior to the trigger, the number of pieces of data subsequent to the trigger, the time interval, and the category of the work machine information.

6. The work machine according to claim 1, wherein the work machine comprises a plurality of the controllers, each of the controllers being able to change the number of pieces of data prior to the trigger, the number of pieces of data subsequent to the trigger, and the time interval individually.

7. The work machine according to claim 2, wherein the work machine comprises a plurality of the controllers, each of the controllers being able to change the number of pieces of data prior to the trigger, the number of pieces of data subsequent to the trigger, the time interval, and the category of the work machine information individually.

8. The work machine according to claim 1, further comprising a communication unit configured to communicate with the outside of the controller, wherein the first definition information is rewritable by wireless communication via the communication unit from the outside of the controller.

9. A work machine comprising:

one or more controllers, each controller configured to control an operation of a different component of the working machine, each controller including:

a first memory configured to store work machine information as information on the work machine and store first definition information;

a second memory to store second definition information; and a processor configured to collect the work machine information, and causing at least one category of the work machine information to be stored in the first memory based on a trigger for causing the first memory to start saving the work machine information, wherein the number of pieces of data prior to the trigger, the number of pieces of data subsequent to the trigger, and a time interval, which are to be stored, are described in each of the first definition information and the second definition information, the processor is configured to cause the work machine information collected in accordance with the first definition information where at least one of the number of pieces of data prior to the trigger of the work machine information collected by the processor before the trigger, the number of pieces of data subsequent to the trigger of the work machine information collected by the processor after the trigger, and a time interval during which the work machine information is collected is described and stored in the first memory, the second definition information stores default contents of the first definition information, the first definition information has been changed from the second definition information based on an instruction from outside of the controller, and the first memory is different from a memory where an instruction to cause the processor to execute an operation to save the work machine information in the first memory is saved.

10. The work machine according to claim 9, wherein the category of the work machine is changeable.

11. The work machine according to claim 10, wherein a plurality of categories of the first definition information is stored in the first memory.

12. The work machine according to claim 11, wherein the plurality of categories of the first definition information is individually changeable from the outside of the controller.

13. The work machine according to claim 4, wherein after the first definition information stored in the first memory is rewritten, when a key switch of the work machine is turned on, the rewritten first definition information becomes effective.

14. A work machine comprising:

a plurality of controllers, each controller configured to control an operation of a different component of the work machine, each controller including:

a first memory to store work machine information associated with a respective component to be controlled and store first definition information;

a second memory to store second definition information; and a processor configured to collect the work machine information and to cause at least one category of the work machine information to be stored in the first memory when a trigger for causing the first memory to start storing the work machine information occurs, wherein the number of pieces of data prior to the trigger, the number of pieces of data subsequent to the trigger, and a time interval, which are to be stored, are described in each of the first definition information and the second definition information, each of the first definition information and the second definition information includes at least one of the number of pieces of data prior to the trigger of the work machine information collected by the processor before the trigger, the number of pieces of data subsequent to the trigger of the work machine information collected by the processor after the trigger, and the time interval during which the work machine information is collected, the second definition information stores default contents of the first definition information, the first definition information has been changed from the second definition information based on an instruction from outside of the controller, and the processor is configured to collect the work machine information in accordance with the number of pieces of data prior to the trigger, the number of pieces of data subsequent to the trigger, and the time interval, which are described in the first definition information that is stored in the first memory and has been changed from the second definition information based on the instruction from outside of the controller.

15. The work machine according to claim 14, wherein the plurality of controllers includes an engine controller and a pump controller.

* * * * *